(12) United States Patent
Weber et al.

(10) Patent No.: US 7,658,069 B2
(45) Date of Patent: Feb. 9, 2010

(54) AIR CHARGER SYSTEM DIAGNOSTIC

(75) Inventors: Olaf Weber, Bloomfield Hills, MI (US);
Timm Kiener, Lake Orion, MI (US);
John Shutty, Clarkston, MI (US)

(73) Assignee: BorgWarner Inc., Auburn Hills, MI (US)

( * ) Notice: Subject to any disclaimer, the term of this patent is extended or adjusted under 35 U.S.C. 154(b) by 411 days.

(21) Appl. No.: 11/498,660

(22) Filed: Aug. 3, 2006

(65) Prior Publication Data

US 2007/0028615 A1 Feb. 8, 2007

Related U.S. Application Data

(60) Provisional application No. 60/705,854, filed on Aug. 5, 2005.

(51) Int. Cl.
*F02B 33/44* (2006.01)
(52) U.S. Cl. .................................. 60/605.1; 60/611
(58) Field of Classification Search ................ 60/605.1, 60/605.2, 611
See application file for complete search history.

(56) References Cited

U.S. PATENT DOCUMENTS

| | | | |
|---|---|---|---|
| 5,205,120 A | 4/1993 | Oblander et al. | |
| 5,685,284 A | 11/1997 | Nakamichi | |
| 6,094,909 A | 8/2000 | Weber et al. | |
| 6,272,860 B1 | 8/2001 | Klein et al. | |
| 6,314,733 B1 * | 11/2001 | Fallahi et al. | 60/598 |
| 6,334,436 B1 | 1/2002 | Paffrath et al. | |
| 6,457,461 B1 * | 10/2002 | Romzek | 123/568.16 |
| 6,470,864 B2 * | 10/2002 | Kim et al. | 123/568.12 |
| 6,601,387 B2 * | 8/2003 | Zurawski et al. | 60/605.2 |
| 6,687,601 B2 * | 2/2004 | Bale et al. | 701/108 |
| 6,817,173 B2 | 11/2004 | Paffrath et al. | |
| 6,820,600 B1 * | 11/2004 | Sisken et al. | 123/568.21 |
| 6,883,323 B2 | 4/2005 | Hummel | |
| 2003/0172913 A1 | 9/2003 | Hummel et al. | |
| 2004/0103646 A1 | 6/2004 | Weigand et al. | |

FOREIGN PATENT DOCUMENTS

| | | |
|---|---|---|
| DE | 198 33 148 A1 | 1/2000 |
| EP | 1 715 165 A | 10/2006 |
| GB | 2 406 394 A | 3/2005 |

* cited by examiner

*Primary Examiner*—Hoang M Nguyen
(74) *Attorney, Agent, or Firm*—Warn Partners, P.C.

(57) ABSTRACT

A method for monitoring and diagnosing an air charger system for use in an engine assembly having pre-existing sensors, having the steps of providing an air charger having a turbine and a compressor operatively coupled to one another. Providing a control unit for monitoring a plurality of operating conditions of the engine assembly. The control unit calculates an expected value of a selected operating condition based upon at least another of the plurality of operating conditions. Comparing the expected value and at least another of the plurality of operating conditions. Diagnosing a fault condition, if present, based upon the expected value and said at least another of said plurality of operating conditions being outside a predetermined tolerance.

19 Claims, 2 Drawing Sheets

AIR CHARGER SYSTEM DIAGNOSTIC

CROSS-REFERENCE TO RELATED APPLICATIONS

This application claims the benefit of U.S. Provisional Application No. 60/705,854, filed Aug. 5, 2005.

FIELD OF THE INVENTION

The present invention relates to the monitoring and diagnostics of an air charger system.

BACKGROUND OF THE INVENTION

Emission control devices are used in the automotive industry for limiting the amount of emissions discharged by the automobile, and to monitor and run diagnostics on the emission control devices. Emission control devices can utilize an electric air pump or a secondary air charger, which inject air into an engine's exhaust system to reduce emissions. It is important to have some way to test the functioning of such a system to ensure the emission reduction is in compliance with the regulations.

In order to monitor or run diagnostics on the emission control device utilizing the electric air pump, the air pump has to be turned on under predetermined conditions. When the air pump is turned on, the engine's oxygen sensors should detect the increase in oxygen in the engine. However, the oxygen sensors may not be able to detect the minimal increase in oxygen in the system, and thus an inaccurate result can be obtained. Further, it may be required to turn the air pump on at a time when the air pump would not normally be turned on or when it is an undesirable time to run the air pump. Under these conditions it is likely that an inaccurate result will be obtained due to operating conditions not being ideal for operating the air pump. In addition, the system will not be as efficient when the air pump must be turned on when it is otherwise desirable to be turned off. This also is undesirable since it draws power and causes wear on the air pump components.

When the emissions control device utilizes the secondary air charger, an air charger system can be diagnosed or monitored using sensors or control units that are only used for running diagnostics on the device. It is, however, undesirable to include sensors or control units in the air charger system that are only used for diagnosing the air charger system. The diagnostic system that only has these single use sensors or control units adds components and thus cost to the air charger system.

Therefore, it is desirable to develop a method for monitoring and diagnosing the air charger system that uses sensors and/or known conditions that are otherwise in the air charger system.

SUMMARY OF THE INVENTION

The present invention relates to a method for monitoring and diagnosing an air charger system for use in an engine assembly having pre-existing sensors having the steps of first providing an air charger having a turbine and a compressor operatively coupled to one another. Providing a control unit for monitoring a plurality of operating conditions of the engine assembly. The control unit calculates an expected value of a selected operating condition based upon at least one of the plurality of operating conditions. Comparing the expected value and at least another of the plurality of operating conditions. Diagnosing a fault condition, if present, based upon the expected value and the at least another of the plurality of operating conditions being outside a predetermined tolerance.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
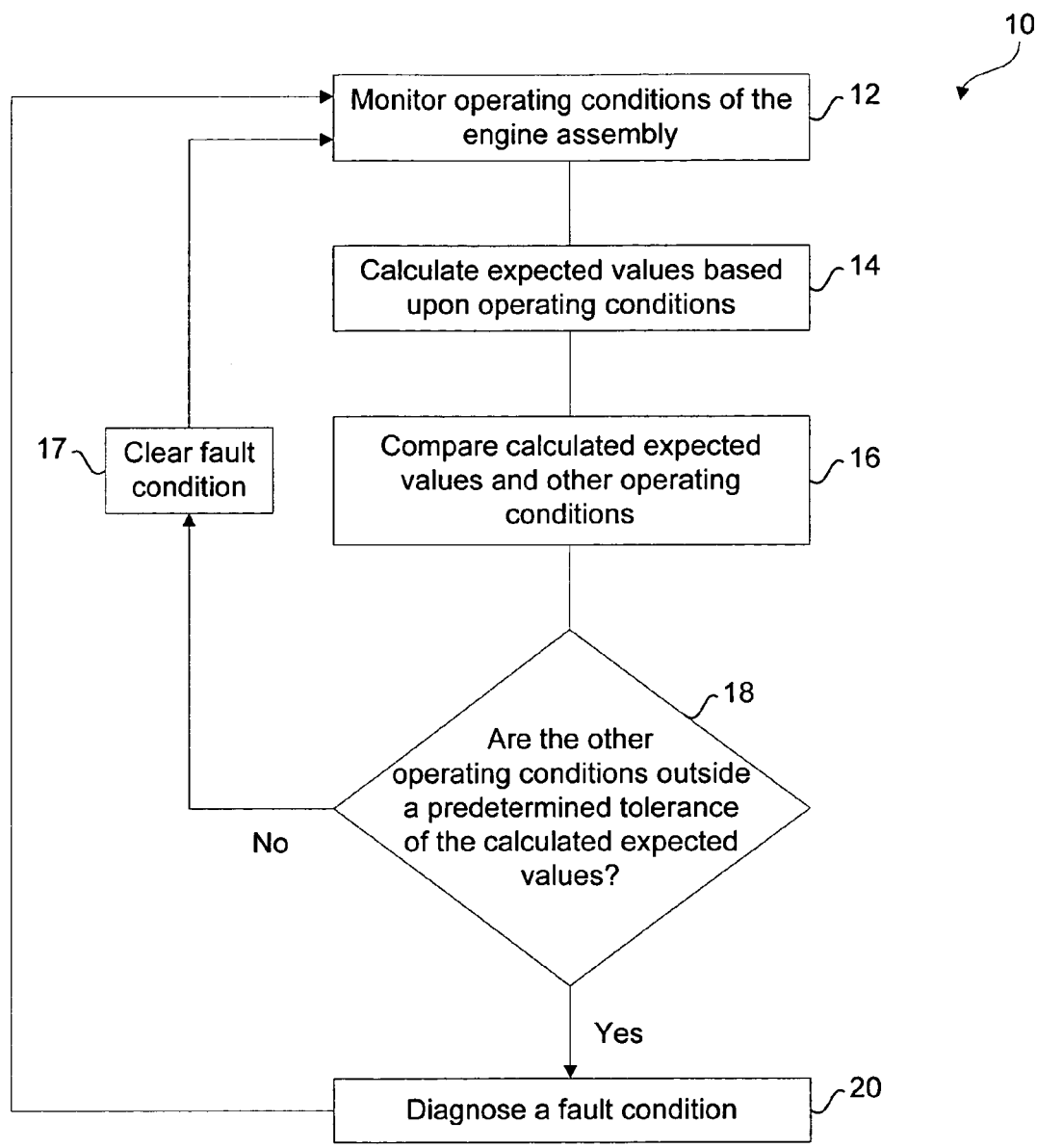
FIG. 1 is a flow chart for a method for monitoring and diagnosing an air charger system in accordance with an embodiment of the present invention.

Referring to FIG. 1, a method for monitoring and diagnosing an air charger system is generally shown at 10. Typically, the air charger system is for an engine assembly having pre-existing sensors, described in greater detail below. At decision box 12, the operating conditions of the engine assembly are monitored. At least one sensor, at least one known condition, or a combination thereof can be used for monitoring or determining the operating conditions of the air charger system. After decision box 12, expected values are calculated by a control unit based upon the monitored operating conditions at decision box 14. Preferably, the expected values of decision box 14 are values for other operating conditions which were not monitored or known and used to calculate the expected values.

At decision box 16, the calculated expected values, of decision box 14, are compared to the other operating conditions indicative of proper air charger functions, which are monitored or known but were not used to calculate the expected values, of decision box 14. In decision box 18, it is then determined if the other operating conditions of decision box 16 are outside a predetermined tolerance of the calculated expected values. If the other operating conditions of decision box 16 are not outside a predetermined tolerance of the calculated values, then the method 10 clears or resets the fault condition at decision box 17, and returns to decision box 12. However, if it is determined that the other operating conditions of decision box 16 are outside a predetermined tolerance of the calculated expected values of decision box 14, then the method 10 proceeds to decision box 20 where a fault condition is diagnosed. After diagnosing fault conditions the method 10 returns to decision box 12.

Figure 2:
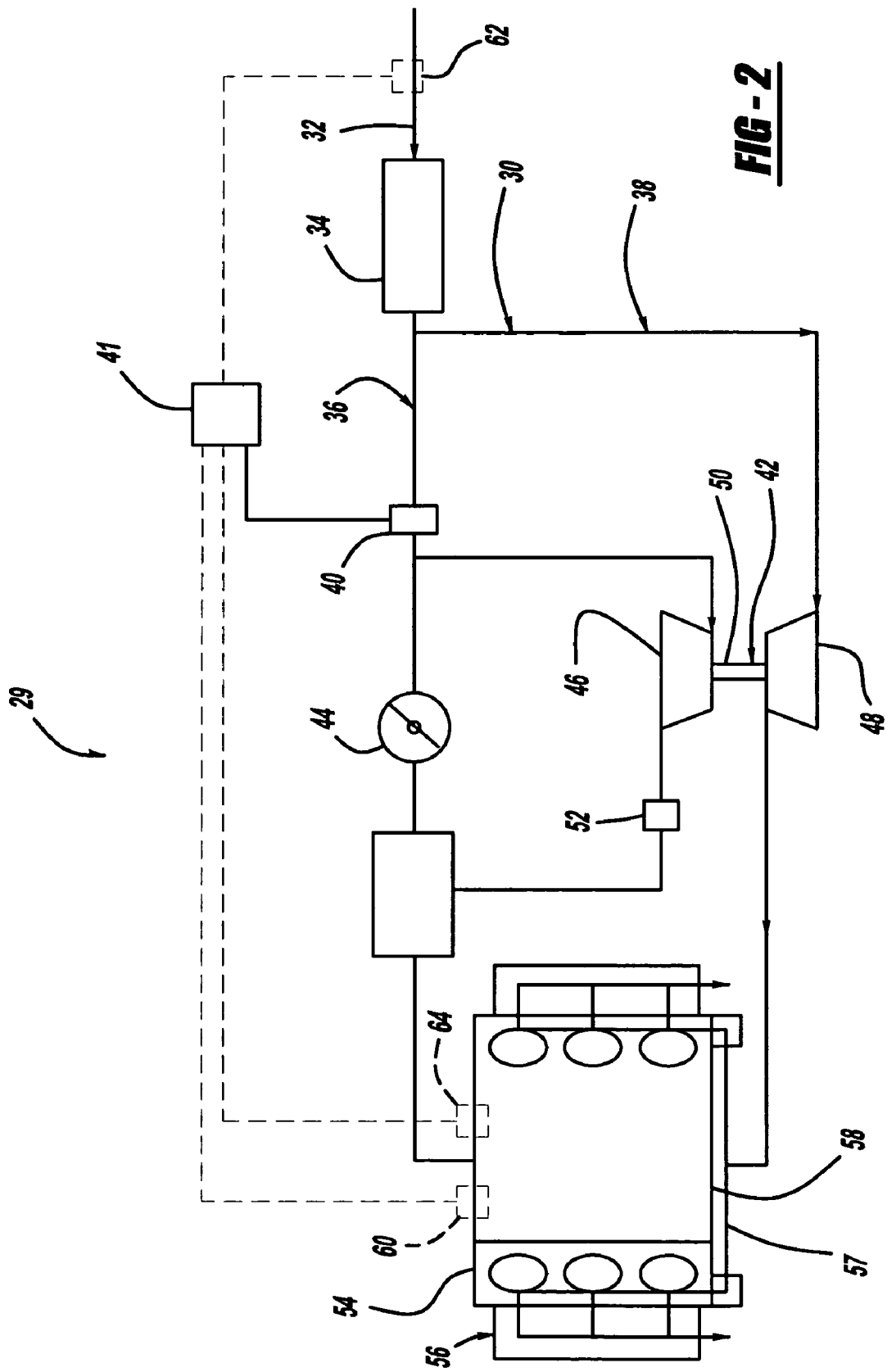
FIG. 2 is a schematic diagram of an engine assembly.

Referring to FIG. 2, an engine assembly is generally shown at 29, having an air charger system generally indicated at 30. Air enters the air charger system 30 through an intake 32 and the air preferably passes through an air cleaner or filter 34. After the air passes through the filter 34, the air is separated into two paths. The air either passes through a first or turbine path generally indicated at 36 or a second or compressor path generally indicated at 38.

In an embodiment, when the air passes through the turbine path 36, the air can pass by a sensor 40 that is interfaced with a control unit 41. Preferably, the sensor 40 is a mass airflow sensor or a pre-existing sensor in the engine assembly 29 which performs other functions, but it is within the scope of the invention that the sensor 40 can be other types of sensors, as described below. After the air passes by the sensor 40, the air is again separated so that the air either passes through a secondary air charger generally indicated at 42 or a throttle 44. The air that passes through the secondary air charger 42 passes through a turbine 46 which is operatively coupled to a compressor 48 by a shaft 50. Thus, as the air rotates the turbine 46, the compressor 48 also rotates since the compressor 48 is connected to the turbine 46 by the shaft 50. A turbine valve 52 is downstream of the turbine 46, in order to control the amount of flow exiting the turbine 46.

The air that does not pass through the turbine 46, passes through the throttle 44, which is in parallel with the turbine 46. The position of throttle 44 can be actuated by any suitable actuation device that can be interfaced with a control unit, such as but not limited to, the control unit 41, in order to control the amount of air flowing by the throttle 44 or the turbine 46. Downstream of the throttle 44, the air that passed through the throttle 44 and the air that passed through the turbine 46 are reconnected and enter an intake 54 of an engine generally indicated at 56. Preferably, the engine 56 is a gasoline combustible engine.

The air that passes through the compressor path 38, passes through the compressor 48, passes through a backpressure valve 57, and is injected into an exhaust 58 of the engine 56. The backpressure valve 57 prevents any air from flowing back towards the compressor 48 from the engine 56, which can result from pressure differences between the compressor 48 and engine 56. Thus, the secondary air charger 42 is emitting compressed air that is injected into the exhaust 58 of the engine 56 for emission control purposes.

In reference to FIGS. 1 and 2, in operation the air charger system 30 is monitored in order for diagnosing a fault condition, if present, (decision box 20). As the air is flowing through the air charger system 30 as described above, the operating conditions of the engine assembly 29 are monitored (decision box 12). These operating conditions are either determined based upon sensors 40 monitoring the engine assembly 29, known values known by the control unit 41, or a combination thereof, described in greater detail below.

By way of explanation but not limitation, the operating conditions monitored and known are the commanded throttle 44 position known by control unit 41, the pressure at the intake 54 monitored by a pressure sensor 60 (shown in phantom) interfaced with the control unit 41, the ambient air pressure monitored by a pressure sensor 62 (shown in phantom) interfaced with the control unit 41, and the temperature of the intake 54 monitored by a temperature sensor 64 (shown in phantom) interfaced with the control unit 41. The calculated expected value of the mass air flow in the air charger system 30 (decision box 14) is then calculated by using the equation:

$$MAF(A, MAP, AAP, IMT) = \frac{(A*AAP)*(k*R*IMT)^{\frac{1}{2}}}{(R*IMT)*\left(\left(\frac{2}{(k+1)}\right)^{\left(\frac{(k+1)}{(k-1)}\right)}\right)^{\frac{1}{2}}};$$

where A is the known commanded position of the throttle 44, MAP is the pressure at the intake 54, AAP is the ambient air pressure, and IMT is the intake 54 temperature.

The calculated mass airflow is then compared to the monitored mass airflow of the air charger system 30 using the mass airflow sensor 40 (decision box 16). It is then determined if the monitored or actual mass airflow is outside a predetermined tolerance of the calculated expected operating conditions (decision box 18). If the monitored mass airflow is within the predetermined tolerance then the method 10 clears the fault condition (decision box 17) and begins monitoring the operations conditions again (decision box 12). However, if the actual mass airflow is outside a predetermined tolerance, then the fault is diagnosed (decision box 20), and the method 10 returns to decision box 12.

It should be appreciated that other sensors can be used to monitor the operating conditions of the air charger system 30, such as but not limited to, pressure sensors, temperature sensors, oxygen sensors, or the like. Depending upon which type of sensor 40, 60, 62, 64 is used in the engine assembly 29, the monitored operating conditions that are used to calculate expected values are likewise adapted or selected. Preferably, the sensors 40, 60, 62, 64 are pre-existing in the engine assembly 29 in that they are used to diagnose the air charger system 30 and have other uses in functioning of the engine assembly 29. Thus, additional components are not needed to implement the diagnostic method 10. This results in a more economical and cost efficient air charger system 30 and diagnostic method 10 than a system that requires additional components which have the sole use of diagnosing the air charger system 30.

Operating conditions that are known and/or monitored to calculate the expected value and the operating conditions known or monitored for comparing to the calculated expected values can be varied depending on available sensors or desired monitoring goals. For example, operating conditions can be monitored (decision box 12) and an expected throttle position can be calculated (decision box 14). The known or commanded throttle position can then be compared to the calculated throttle position (decision box 16) to determine if the commanded throttle position is outside a predetermined tolerance (decision box 18). Thus, the operating conditions that are monitored can be used in a predetermined equation to calculate an expected value of other operating conditions (decision box 16), which are compared to determine if the air charger system 30 is functioning properly (decision box 18), and if not, then diagnose a fault condition (decision box 20).

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for monitoring and diagnosing an air charger system for an engine assembly having pre-existing sensors, said method comprising the steps of:

providing a secondary air charger system having a turbine in fluid communication with the intake flow path of said engine assembly, and a compressor in fluid communication with the path of exhaust gas flow of said engine assembly, said turbine and said compressor operatively coupled to one another;

providing a control unit for monitoring a plurality of operating conditions of said secondary air charger;

providing at least one of said pre-existing sensors, at least one known condition, and a combination thereof, to be used for monitoring of said plurality of operating conditions of said secondary air charger;

providing a throttle in operative fluid communication with said turbine for controlling the flow through said turbine, wherein said at least one known condition is a known commanded position of said throttle;

providing one of said pre-existing sensors to be a mass air flow sensor, said mass air flow sensor being located upstream of said throttle and said secondary air charger system;

said control unit calculating an expected value of a selected operating condition based upon at least one of said plurality of operating conditions;

comparing said expected value and at least another of said plurality of operating conditions; and diagnosing a fault condition, if present, based upon said expected value and said at least another of said plurality of operating conditions being outside a predetermined tolerance.

2. The method for monitoring and diagnosing a secondary air charger system of claim 1, further comprising the step of monitoring said plurality of operating conditions after diagnosing said fault condition.

3. The method for monitoring and diagnosing a secondary air charger system of claim 1, further comprising the step of clearing said fault condition and monitoring said operating conditions if said expected value is within said predetermined tolerance of said at least another of said plurality of operating conditions.

4. The method for monitoring and diagnosing a secondary air charger system of claim 1, further comprising the step of said pre-existing sensors further comprising at least one of a pressure sensor, an oxygen sensor, a temperature sensor, and a combination thereof.

5. The method for monitoring and diagnosing a secondary air charger system of claim 1, further comprising the step of determining an air pressure in an intake of said engine assembly.

6. The method for monitoring and diagnosing a secondary air charger system of claim 1, further comprising the step of determining an ambient air pressure.

7. The method for monitoring and diagnosing a secondary air charger system of claim 1, further comprising the step of determining a temperature in an intake of said engine assembly.

8. The method for monitoring and diagnosing a secondary air charger system of claim 1, further comprising the step of said control unit calculating an expected throttle position based upon said operating conditions.

9. The method for monitoring and diagnosing a secondary air charger system of claim 8, further comprising the step of comparing said commanded throttle position to said calculated expected throttle position and diagnosing a fault condition based upon said commanded throttle position and said calculated expected throttle position being outside a predetermined tolerance.

10. The method for monitoring and diagnosing a secondary air charger system of claim 1, further comprising the step of providing a turbine valve in operative fluid communication with said turbine for controlling the flow of gaseous fluid exiting said turbine.

11. A method for monitoring and diagnosing an air charger system for use in an engine assembly having pre-existing sensors, said method comprising the steps of:

providing a secondary air charger having a turbine in fluid communication with the intake flow path of said engine assembly, and a compressor in fluid communication with the path of exhaust gas flow of said engine assembly, said turbine and said compressor operatively coupled to one another;

providing a control unit interfaced with a plurality of sensors;

providing at least one of said plurality of sensors, at least one known condition, and a combination thereof, to be used for monitoring of said plurality of operating conditions of said secondary air charger;

providing a throttle in operative fluid communication with said turbine for controlling the flow through said turbine, wherein said known condition is a known commanded position of said throttle;

providing one of said plurality of sensors to be a mass air flow sensor, said mass air flow sensor being located upstream of said throttle and said secondary air charger system;

monitoring said plurality of operating conditions of said secondary air charger by way of inputs from said plurality of sensors;

said control unit calculating an expected value of a selected one of said plurality of operating conditions based upon data collected from at least one of said plurality of sensors, at least one known value, and a combination thereof;

comparing said expected value and data collected from said mass airflow sensor;

diagnosing a fault condition, if present, based upon said expected value and said data collected from said mass airflow sensor being outside a predetermined tolerance, and clearing said fault condition if said expected value is within said predetermined tolerance of said data collected from said mass airflow sensor.

12. The method for monitoring and diagnosing a secondary air charger system of claim 11, wherein said plurality of sensors is at least one of a pressure sensor, a temperature sensor, an oxygen sensor, and a combination thereof.

13. The method for monitoring and diagnosing a secondary air charger system of claim 11, further comprising the step of determining an air pressure in an intake of said engine assembly.

14. The method for monitoring and diagnosing a secondary air charger system of claim 11, further comprising the step of determining an ambient air pressure.

15. The method for monitoring and diagnosing a secondary air charger system of claim 11, further comprising the step of determining a temperature in an intake of said engine assembly.

16. A secondary air charger system for use in an engine assembly having at least an engine, said secondary air charger system comprising:

a turbine in fluid communication with an intake of said engine;

an intake located upstream of and operable for providing airflow into said secondary air charger system and being in fluid communication with said turbine;

a throttle in operative fluid communication with said intake located upstream of said secondary air charger system, wherein said throttle is in parallel with said turbine and controls the flow from said intake located upstream of said secondary air charger system through said turbine;

a compressor in fluid communication with said intake located upstream of said secondary air charger system, wherein said compressor is operatively coupled to said turbine, and compressed air is emitted from said compressor and enters an exhaust of said engine; and a plurality of sensors for monitoring operating conditions of said secondary air charger system and diagnosing a fault condition upon failure of emitting compressed air from said compressor, one of said plurality of sensors being a mass air flow sensor, said mass air flow sensor being located upstream of said throttle and said secondary air charger system;

wherein one of said operating conditions is a known commanded position of said throttle.

17. The secondary air charger system of claim 16, wherein said at least one sensor is a pressure sensor, a temperature sensor, an oxygen sensor, and a combination thereof.

18. The secondary air charger system of claim 16, further comprising a turbine valve in operative fluid communication between said engine and said turbine for controlling the flow exiting said turbine.

19. The secondary air charger system of claim 16, further comprising a control unit interfaced with said at least one sensor, wherein the data collected from said at least one sensor by said control unit is compared to a predetermined value based upon said operating conditions of said engine assembly to determine if said air charger system is functioning properly.

* * * * *